United States Patent
Shimizu et al.

(10) Patent No.: US 10,340,814 B2
(45) Date of Patent: Jul. 2, 2019

(54) GATE-BLOCKING A DC/DC CONVERTER BASED UPON OUTPUT CURRENT OF AN AC REACTOR IN A POWER CONVERSION DEVICE

(71) Applicant: Sumitomo Electric Industries, Ltd., Osaka-shi (JP)

(72) Inventors: Yusuke Shimizu, Osaka (JP); Tetsuo Akita, Osaka (JP); Naoki Ayai, Osaka (JP)

(73) Assignee: Sumitomo Electric Industries, Ltd., Osaka-shi (JP)

(*) Notice: Subject to any disclaimer, the term of this patent is extended or adjusted under 35 U.S.C. 154(b) by 0 days.

(21) Appl. No.: 16/084,419

(22) PCT Filed: Oct. 24, 2016

(86) PCT No.: PCT/JP2016/081441
§ 371 (c)(1),
(2) Date: Sep. 12, 2018

(87) PCT Pub. No.: WO2017/163473
PCT Pub. Date: Sep. 28, 2017

(65) Prior Publication Data
US 2019/0081575 A1    Mar. 14, 2019

(30) Foreign Application Priority Data
Mar. 24, 2016 (JP) .................. 2016-060067

(51) Int. Cl.
*H02M 7/48* (2007.01)
*H02H 3/08* (2006.01)
*H02M 1/32* (2007.01)

(52) U.S. Cl.
CPC .............. *H02M 7/48* (2013.01); *H02H 3/08* (2013.01); *H02M 1/32* (2013.01)

(58) Field of Classification Search
CPC ... H02H 3/07–3/105; H02M 2001/007; H02M 2001/0009; H02M 1/32; H02M 7/42–7/5395
See application file for complete search history.

(56) References Cited

U.S. PATENT DOCUMENTS

| 2,545,987 | A | * | 3/1951 | Blackburn | .............. H02H 3/06 361/81 |
| 2011/0205766 | A1 | * | 8/2011 | Rodriguez | ............. H02M 7/48 363/37 |

(Continued)

FOREIGN PATENT DOCUMENTS

| JP | 2008-220001 A | 9/2008 |
| JP | 2014-241714 A | 12/2014 |

*Primary Examiner* — Adolf D Berhane
*Assistant Examiner* — Peter M Novak
(74) *Attorney, Agent, or Firm* — Baker Botts LLP; Michael A. Sartori

(57) ABSTRACT

Control is performed such that, for generating an AC voltage from a DC voltage, a period during which a DC/DC converter boosts the DC voltage and an inverter performs one of polarity non-inversion passing and polarity inversion passing, and a period during which the DC/DC converter is stopped and the inverter performs step-down operation and one of polarity non-inversion passing and polarity inversion passing, arise alternately in one AC cycle. Gate blocking is temporarily performed for only the DC/DC converter, upon occurrence of a phenomenon in which, by start of power feeding to a load connected to an AC electric path, an absolute value of a current flowing through an AC reactor reaches a predetermined converter gate block threshold value lower than an instantaneous overcurrent protection threshold value.

8 Claims, 11 Drawing Sheets

(56) References Cited

U.S. PATENT DOCUMENTS

| 2014/0286060 | A1* | 9/2014 | Sugiura | B60L 11/1803 |
| | | | | 363/56.01 |
| 2017/0214313 | A1* | 7/2017 | Kikuchi | H02H 3/093 |
| 2018/0115255 | A1* | 4/2018 | Jalili | H02J 3/385 |

* cited by examiner

FIG. 5
(a) 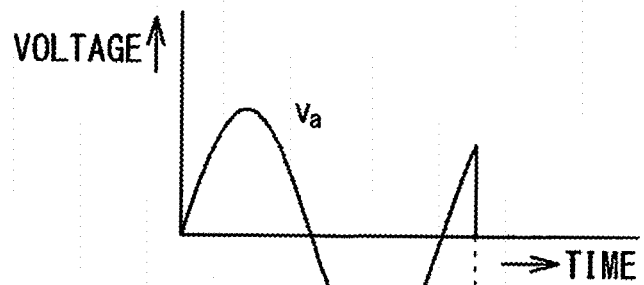
(b) 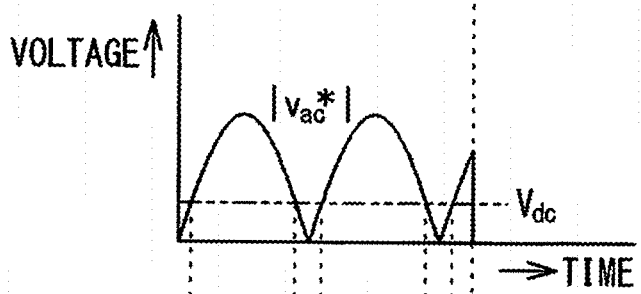
(c) 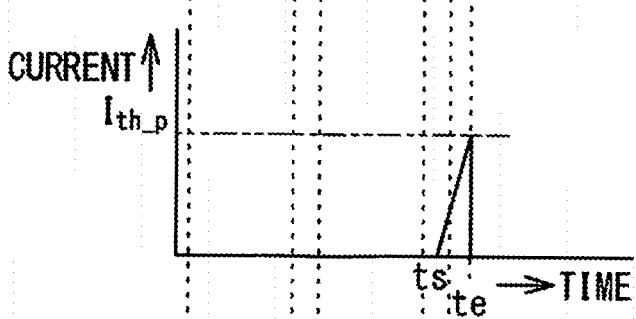
(d) DC/DC CONVERTER GATE VOLTAGE 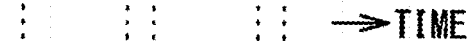
(e) INVERTER GATE VOLTAGE 

GATE-BLOCKING A DC/DC CONVERTER BASED UPON OUTPUT CURRENT OF AN AC REACTOR IN A POWER CONVERSION DEVICE

TECHNICAL FIELD

The present invention relates to a power conversion device and a control method therefor.

This application claims priority on Japanese Patent Application No. 2016-060067 filed on Mar. 24, 2016, the entire contents of which are incorporated herein by reference.

BACKGROUND ART

In general, a power conversion device that performs DC-to-AC power conversion is provided with a DC/DC converter and an inverter. The DC/DC converter boosts a DC voltage of a DC power supply to a certain intermediate voltage and outputs the intermediate voltage to a DC bus, and the inverter converts the intermediate voltage to an AC voltage waveform. Here, the intermediate voltage is higher than the peak value (wave crest value) of the AC voltage. In order to cause the intermediate voltage to be a stable DC voltage, a large-capacitance capacitor of, for example, mF (milli-farad) level, is used as an intermediate capacitor connected to the DC bus. In a case of performing such power conversion, the DC/DC converter and the inverter constantly perform high-speed switching, and thus power loss such as switching loss arises correspondingly.

In order to reduce power losses and enhance efficiency, the applicant proposes a control method that compares the absolute value of the instantaneous value of an AC voltage to be generated and the DC voltage on the DC power supply side. A DC/DC converter should generate a DC waveform part for which the voltage needs to be stepped up and the inverter should generate an AC waveform part for which the voltage needs to be stepped down (see Patent Literature 1). In this control method, the DC/DC converter and the inverter alternately perform high-speed switching operations. Therefore, the DC/DC converter and the inverter alternately have stop periods in which high-speed switching is stopped, within one AC cycle. This method significantly reduces power losses. In this control method, the voltage of the DC bus becomes a voltage having a waveform like a pulsating current in which the waveform around the peak value of the AC voltage waveform is overlaid on the DC voltage. Therefore, as the intermediate capacitor connected to the DC bus, a small-capacitance capacitor (for example, several tens of μF) is used so as not to smooth the AC voltage waveform part.

As another reference, the following control method is also proposed: a pulsating current waveform as a base for the AC voltage waveform is generated by only switching of the DC/DC converter, and the inverter performs non-inversion or inversion of the polarity per one cycle of the pulsating current (see Patent Literature 2).

CITATION LIST

Patent Literature

PATENT LITERATURE 1: Japanese Laid-Open Patent Publication No. 2014-241714

PATENT LITERATURE 2: Japanese Laid-Open Patent Publication No. 2008-220001

SUMMARY OF INVENTION

One expression of the present invention is a power conversion device provided between a DC power supply and an AC electric path and performing DC/AC power conversion in a state in which a DC voltage of the DC power supply is lower than a peak value of an AC voltage of the AC electric path, the power conversion device including: a DC/DC converter provided between the DC power supply and a DC bus; an intermediate capacitor connected to the DC bus and having such a small capacitance as not to smooth a pulsation (undulation) that is included in a voltage of the DC bus and has a frequency twice as high as a frequency of the AC voltage; an inverter connected to the DC bus; a filter circuit provided between the inverter and the AC electric path and having an AC reactor and an AC-side capacitor; a current sensor configured to detect a current flowing through the AC reactor; and a control unit configured to perform control such that, for generating the AC voltage from the DC voltage, a period during which the DC/DC converter boosts the DC voltage and the inverter performs one of polarity non-inversion passing and polarity inversion passing, and a period during which the DC/DC converter is stopped and the inverter performs step-down operation and one of polarity non-inversion passing and polarity inversion passing, arise alternately in one AC cycle, wherein the control unit temporarily performs gate blocking for only the DC/DC converter, upon occurrence of a phenomenon in which, by start of power feeding to a load connected to the AC electric path, an absolute value of the current flowing through the AC reactor reaches a predetermined converter gate block threshold value lower than an instantaneous overcurrent protection threshold value.

One expression of the present invention from another aspect is a control method for a power conversion device, the power conversion device being provided between a DC power supply and an AC electric path and performing DC/AC power conversion in a state in which a DC voltage of the DC power supply is lower than a peak value of an AC voltage of the AC electric path, the power conversion device including: a DC/DC converter provided between the DC power supply and a DC bus; an intermediate capacitor connected to the DC bus and having such a small capacitance as not to smooth a pulsation that is included in a voltage of the DC bus and has a frequency twice as high as a frequency of the AC voltage; an inverter connected to the DC bus; and a filter circuit provided between the inverter and the AC electric path and having an AC reactor and an AC-side capacitor, the control method including: performing control such that, for generating the AC voltage from the DC voltage, a period during which the DC/DC converter boosts the DC voltage and the inverter performs one of polarity non-inversion passing and polarity inversion passing, and a period during which the DC/DC converter is stopped and the inverter performs step-down operation and one of polarity non-inversion passing and polarity inversion passing, arise alternately in one AC cycle; and temporarily performing gate blocking for only the DC/DC converter, upon occurrence of a phenomenon in which, by start of power feeding to a load connected to the AC electric path, an absolute value of the current flowing through the AC reactor reaches a predetermined converter gate block threshold value lower than an instantaneous overcurrent protection threshold value.

BRIEF DESCRIPTION OF DRAWINGS

FIG. 5 is a voltage/current waveform diagram when a nonlinear load such as a capacitor-input rectification circuit is connected as a load of the power conversion device in FIG. 1 in a case of not taking a particular measure, for comparison.

DESCRIPTION OF EMBODIMENTS

Problems to be Solved by the Present Disclosure

In the aforementioned control method in Patent Literature 1, in a case where, for example, a nonlinear load such as a capacitor-input rectification circuit is connected as a load on the AC side, it has been found that an inconvenience might occur in which a large current flows transiently to reach an overcurrent protection threshold value of the power conversion device, so that operation is stopped.

Figure 11:
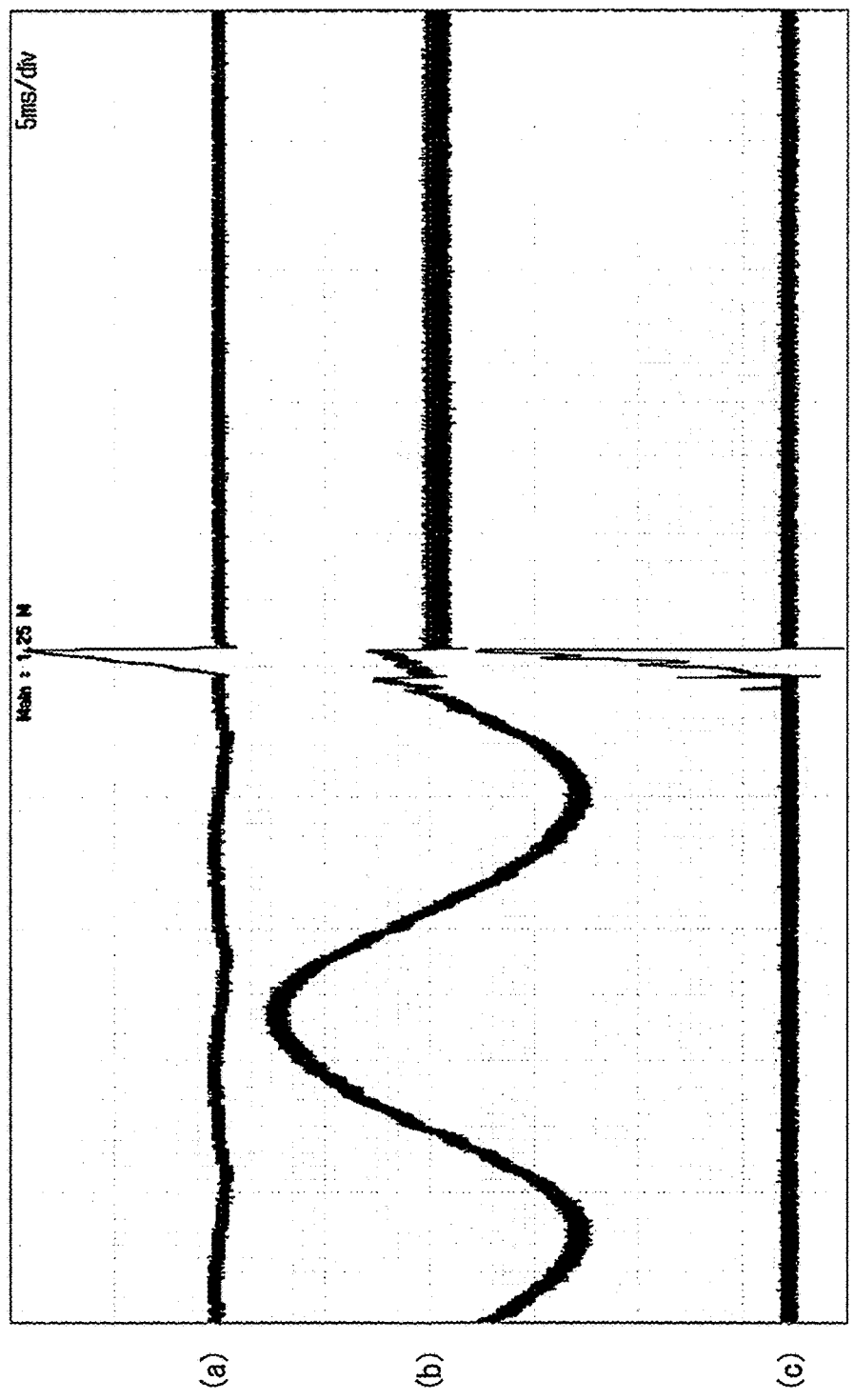
FIG. 11 is a graph showing a current/voltage of each part in a case where a nonlinear load such as a capacitor-input rectification circuit is connected as a load on the AC side in a conventional power conversion device.

FIG. 11 is a graph showing a current/voltage of each part in a case where a nonlinear load such as a capacitor-input rectification circuit is connected as a load on the AC side. In FIG. 11, (a) shows the current of the DC power supply (storage battery), (b) shows the waveform of the AC output voltage, and (c) shows the AC output current. When the load is connected at a time near the center on the horizontal axis, a large current flows instantaneously as the AC output current. When the peak value thereof reaches the overcurrent protection threshold value, the power conversion device is stopped by protection, so that the AC output voltage becomes 0.

In the control, it is conceivable that a target value for the output current to the AC side or a target value for the input current from the DC power supply is limited so that the current does not reach the overcurrent protection threshold value. However, for this purpose, it is necessary that the voltage of the DC bus is in accordance with the target value, as a condition.

However, when a large current flows instantaneously through the load, the voltage of the DC bus becomes smaller than the target value, and in order to increase this voltage, a current flowing through a DC reactor of the DC/DC converter reaches the overcurrent protection threshold value at once. The reason why the voltage of the DC bus readily decreases instantaneously is that the intermediate capacitor connected to the DC bus has a small capacitance in the above control method.

Considering the above problem, an object of the present disclosure is to prevent the power conversion device from being stopped by protection even when a nonlinear load is connected.

Effects of the Present Disclosure

According to the present disclosure, the power conversion device can suppress the inrush current without stopping operation by instantaneous overcurrent protection even when a nonlinear load is connected.

SUMMARY OF EMBODIMENTS

Summary of the embodiments of the present invention includes at least the following.

(1) This is a power conversion device provided between a DC power supply and an AC electric path and performing DC/AC power conversion in a state in which a DC voltage of the DC power supply is lower than a peak value of an AC voltage of the AC electric path, the power conversion device including: a DC/DC converter provided between the DC power supply and a DC bus; an intermediate capacitor connected to the DC bus and having such a small capacitance as not to smooth a pulsation (undulation) that is included in a voltage of the DC bus and has a frequency twice as high as a frequency of the AC voltage; an inverter connected to the DC bus; a filter circuit provided between the inverter and the AC electric path and having an AC reactor and an AC-side capacitor; a current sensor configured to detect a current flowing through the AC reactor; and a control unit configured to perform control such that, for generating the AC voltage from the DC voltage, a period during which the DC/DC converter boosts the DC voltage and the inverter performs one of polarity non-inversion passing and polarity inversion passing, and a period during which the DC/DC converter is stopped and the inverter performs step-down operation and one of polarity non-inversion passing and polarity inversion passing, arise alternately in one AC cycle, wherein the control unit temporarily performs gate blocking for only the DC/DC converter, upon occurrence of a phenomenon in which, by start of power feeding to a load connected to the AC electric path, an absolute value of the current flowing through the AC reactor reaches a predetermined converter gate block threshold value lower than an instantaneous overcurrent protection threshold value.

Such a power conversion device basically performs control such that, in one AC cycle, a period during which the DC/DC converter performs boost operation and the inverter stops high-frequency switching, and a period during which the inverter performs step-down operation and the DC/DC converter stops high-frequency switching, arise alternately. The generated AC voltage waveform is, as it were, a combined waveform outputted by the DC/DC converter and the inverter operating alternately. A waveform part having a relatively great absolute value around the peak value is generated by the DC/DC converter, and a waveform part having a relatively small absolute value around a zero cross point is generated by the inverter.

In a case where the load is, for example, a nonlinear load such as a capacitor-input rectification circuit or an inductive load (e.g., motor), a large inrush current flows when power feeding from the power conversion device to the load is started. Then, when the absolute value of a current flowing through the AC reactor by the start of power feeding to the load reaches the converter gate block threshold value, the control unit temporarily performs gate blocking for only the DC/DC converter, without performing gate blocking for the inverter.

By gate blocking for the DC/DC converter, if the DC/DC converter is operating, the boost operation is immediately stopped. Thus, the output current flowing through the AC reactor is reduced and does not reach the instantaneous overcurrent protection threshold value. On the other hand, gate blocking is not performed for the inverter, and therefore, when a timing (phase) for the inverter to perform high-frequency switching has come, a voltage in a waveform part having a smaller absolute value, of the AC voltage waveform to be generated, is outputted, and output to the load approaches a steady state.

Thus, even if a nonlinear load is connected, the power conversion device can suppress an inrush current without stopping operation by instantaneous overcurrent protection.

(2) In the power conversion device of (1), for example, the control unit cancels the gate blocking, at next zero-crossing of a voltage outputted to the load, after the gate blocking is performed.

In this case, in the half cycle from this next zero-crossing, boost operation of the DC/DC converter can be performed again.

(3) In the power conversion device of (2), for example, the control unit repeatedly executes the gate blocking and the cancellation of the gate blocking until the phenomenon no longer occurs.

In this case, until the output current to the load no longer reaches the converter gate block threshold value, the gate blocking and the subsequent cancellation can be repeated a necessary number of times.

(4) In the power conversion device of any one of (1) to (3), the current sensor may be provided between the load and the AC-side capacitor and connected in series to the load.

The current sensor may be connected in series to the AC reactor with no element therebetween, but in this case, it is difficult to detect sharp change in the current, because of the influence of the AC reactor. In this regard, in a case where the current sensor is provided between the load and the AC-side capacitor and connected in series to the load, sharp change in the current flowing through the load can be detected with more excellent responsiveness.

(5) A control method aspect is a control method for a power conversion device, the power conversion device being provided between a DC power supply and an AC electric path and performing DC/AC power conversion in a state in which a DC voltage of the DC power supply is lower than a peak value of an AC voltage of the AC electric path, the power conversion device including: a DC/DC converter provided between the DC power supply and a DC bus; an intermediate capacitor connected to the DC bus and having such a small capacitance as not to smooth a pulsation that is included in a voltage of the DC bus and has a frequency twice as high as a frequency of the AC voltage; an inverter connected to the DC bus; and a filter circuit provided between the inverter and the AC electric path and having an AC reactor and an AC-side capacitor, the control method including: performing control such that, for generating the AC voltage from the DC voltage, a period during which the DC/DC converter boosts the DC voltage and the inverter performs one of polarity non-inversion passing and polarity inversion passing, and a period during which the DC/DC converter is stopped and the inverter performs step-down operation and one of polarity non-inversion passing and polarity inversion passing, arise alternately in one AC cycle; and temporarily performing gate blocking for only the DC/DC converter, upon occurrence of a phenomenon in which, by start of power feeding to a load connected to the AC electric path, an absolute value of the current flowing through the AC reactor reaches a predetermined converter gate block threshold value lower than an instantaneous overcurrent protection threshold value.

In such a control method for a power conversion device, control is basically performed such that, in one AC cycle, a period during which the DC/DC converter performs boost operation and the inverter stops high-frequency switching, and a period during which the inverter performs step-down operation and the DC/DC converter stops high-frequency switching, arise alternately. The generated AC voltage waveform is, as it were, a combined waveform outputted by the DC/DC converter and the inverter operating alternately. A waveform part having a great absolute value around the peak value is generated by the DC/DC converter, and a waveform part having a small absolute value around a zero cross point is generated by the inverter.

In a case where the load is, for example, a nonlinear load such as a capacitor-input rectification circuit or an inductive load (e.g., motor), a large inrush current flows when power feeding from the power conversion device to the load is started. Then, when the absolute value of a current flowing through the AC reactor by the start of power feeding to the load reaches the converter gate block threshold value, the control unit temporarily performs gate blocking for only the DC/DC converter, without performing gate blocking for the inverter.

By gate blocking for the DC/DC converter, if the DC/DC converter is operating, the boost operation is immediately stopped. Thus, the output current flowing through the AC reactor is reduced and does not reach the instantaneous overcurrent protection threshold value. On the other hand, gate blocking is not performed for the inverter, and therefore, when a timing (phase) for the inverter to perform high-frequency switching has come, a voltage in a waveform part having a smaller absolute value, of the AC voltage waveform to be generated, is outputted, and output to the load approaches a steady state.

In such a control method for a power conversion device, even if a nonlinear load is connected, it is possible to suppress an inrush current without stopping operation by instantaneous overcurrent protection.

(6) Aside from (1), the power conversion device can also be expressed as follows.

That is, this is a power conversion device provided between a DC power supply and an AC electric path and performing DC/AC power conversion in a state in which a DC voltage of the DC power supply is lower than a peak value of an AC voltage of the AC electric path, the power conversion device including: a DC/DC converter provided between the DC power supply and a DC bus; an intermediate capacitor connected to the DC bus and having such a small capacitance as not to smooth a pulsation that is included in a voltage of the DC bus and has a frequency twice as high as a frequency of the AC voltage; an inverter connected to the DC bus; a filter circuit provided between the inverter and the AC electric path and having an AC reactor and an AC-side capacitor; a current sensor configured to detect a current flowing through the AC reactor; and a control unit configured to perform control such that, for generating the AC voltage from the DC voltage, a period during which the DC/DC converter boosts the DC voltage and the inverter performs one of polarity non-inversion passing and polarity inversion passing, and a period during which the DC/DC converter is stopped and the inverter performs step-down operation and one of polarity non-inversion passing and polarity inversion passing, arise alternately in one AC cycle (the configuration thus far is the same as in (1)). Further, upon occurrence of a phenomenon in which, by start of power feeding to a load connected to the AC electric path, an absolute value of the current flowing through the AC reactor reaches a predetermined converter gate block threshold value lower than an instantaneous overcurrent protection threshold value, the control unit allows the inverter to perform switching operation without performing gate blocking for the inverter, and performs gate blocking for the DC/DC converter until next zero-crossing of a voltage outputted to the load.

Such a power conversion device provides the same operational effect as in the power conversion device of (1). In addition, also during a period until the next zero-crossing after the gate blocking, the waveform is not interrupted and a certain level of voltage is outputted, and the waveform part outputted through operation of the inverter is maintained.

DETAILS OF EMBODIMENTS

Hereinafter, the details of one embodiment of the present invention will be described with reference to the drawings.

«Circuit Configuration Example»

Figure 1:
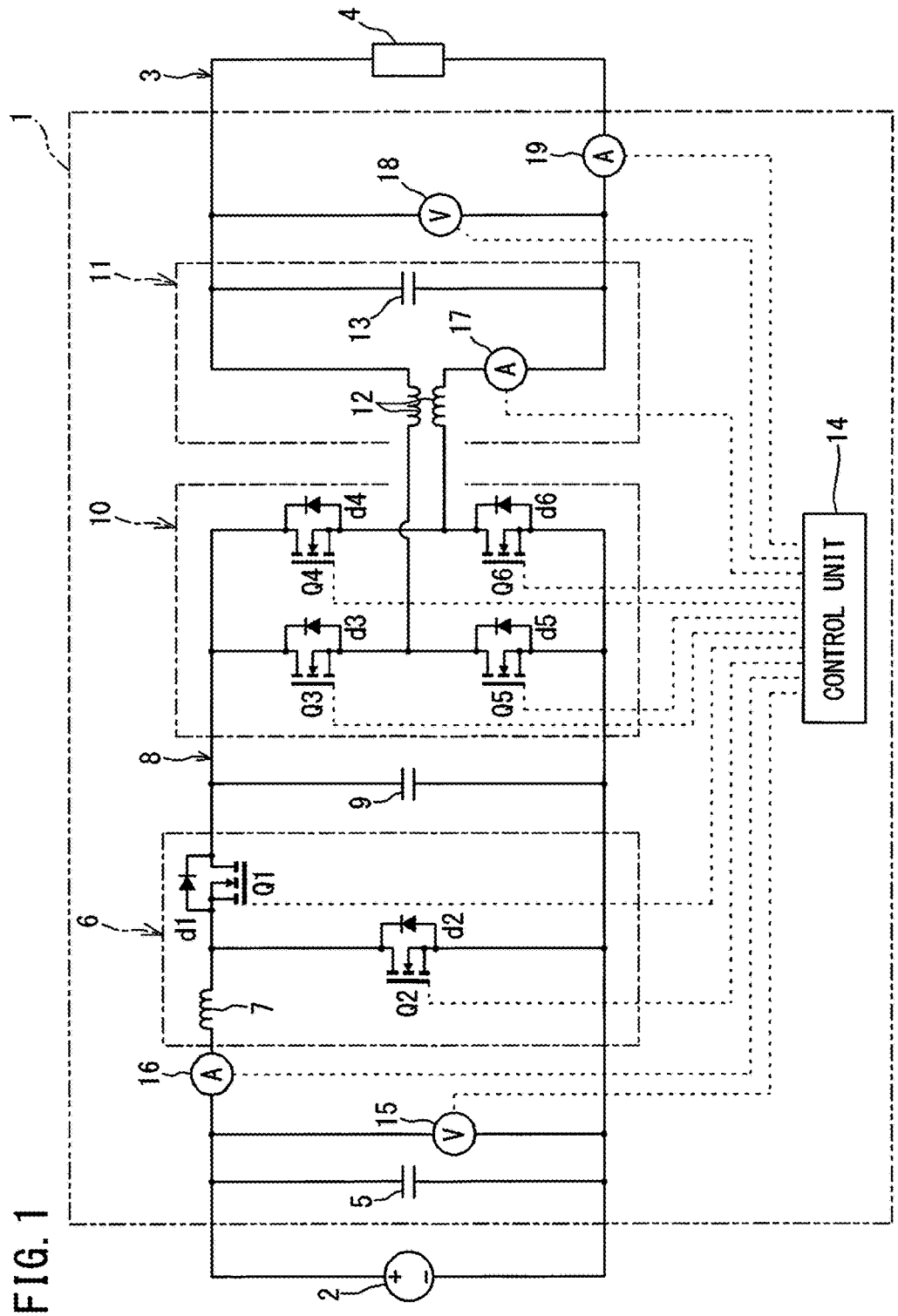
FIG. 1 is an example of a circuit diagram of a power conversion device.

FIG. 1 is an example of a circuit diagram of a power conversion device. In FIG. 1, a power conversion device 1 is provided between a DC power supply 2 and an AC electric path 3, and performs DC/AC power conversion in a state in which the DC voltage of the DC power supply 2 is lower than the peak value (wave crest value) of the AC voltage of the AC electric path 3. The power conversion device 1 can supply an AC power generated on the basis of the DC power supply 2, as an autonomous output, to a load 4 connected to the AC electric path 3, for example.

The power conversion device 1 includes, as main circuit configuration elements, a DC-side capacitor 5, a DC/DC converter 6, an intermediate capacitor 9, an inverter 10, and a filter circuit 11. The DC/DC converter 6 includes a DC reactor 7, a high-side switching element Q1, and a low-side switching element Q2, to form a DC chopper circuit. As the switching elements Q1, Q2, for example, MOSFETs (Metal-Oxide-Semiconductor Field Effect Transistors) can be used. The switching elements Q1, Q2 that are MOSFETs have diodes (body diodes) d1, d2, respectively. The switching elements Q1, Q2 are controlled by a control unit 14.

The high-voltage side of the DC/DC converter 6 is connected to a DC bus 8. The intermediate capacitor 9 connected between two lines of the DC bus 8 has a small capacitance (100 μf or smaller, e.g., several tens of μf), and exerts a smoothing function on a voltage switched at a high frequency (e.g., 20 kHz), but does not exert a smoothing function on a voltage that varies at a frequency (100 Hz or 120 Hz) about twice as high as the commercial frequency.

The inverter 10 connected to the DC bus 8 includes switching elements Q3 to Q6 forming a full-bridge circuit. The switching elements Q3 to Q6 are, for example, MOSFETs. In the case of MOSFETs, the switching elements Q3 to Q6 have diodes (body diodes) d3 to d6, respectively. The switching elements Q3 to Q6 are controlled by the control unit 14.

A filter circuit 11 is provided between the inverter 10 and the AC electric path 3. The filter circuit 11 includes an AC reactor 12, and an AC-side capacitor 13 provided on the load 4 side (right side in the drawing) with respect to the AC reactor 12. The filter circuit 11 prevents high-frequency noise occurring in the inverter 10 from passing and leaking to the AC electric path 3 side.

As circuit elements for measurement, a voltage sensor 15 and a current sensor 16 are provided on the low-voltage side (left side in the drawing) of the DC/DC converter 6. The voltage sensor 15 is connected in parallel to the DC power supply 2 and detects a voltage between both ends of the DC power supply 2. Information about the detected voltage is provided to the control unit 14. The current sensor 16 detects a current flowing through the DC/DC converter 6. Information about the detected current is provided to the control unit 14.

On the AC side, a current sensor 17 for detecting a current flowing through the AC reactor 12 is provided. Information about the current detected by the current sensor 17 is provided to the control unit 14. A voltage sensor 18 is provided in parallel to the AC-side capacitor 13. A current sensor 19 is provided to the electric path connecting the load 4 and the power conversion device 1. Information about the voltage detected by the voltage sensor 18 and information about the current detected by the current sensor 19 are provided to the control unit 14.

The control unit 14, for example, includes a computer and realizes necessary control functions by the computer executing software (computer program). The software is stored in a storage device (not shown) of the control unit 14. However, it is also possible to configure the control unit from only a hardware circuit not including a computer.

In a case where the DC power supply 2 is a photovoltaic panel, the power conversion device 1 performs only DC-to-AC conversion. In a case where the DC power supply 2 is a storage battery, the power conversion device 1 can perform not only DC-to-AC conversion, but also AC-to-DC conversion to charge the storage battery. That is, the inverter 10 and the DC/DC converter 6 can operate to transmit power in both directions.

«Minimum Switching Conversion Method»

Next, the outline of operation in a minimum switching conversion method executed by the power conversion device 1 will be described.

Figure 2:
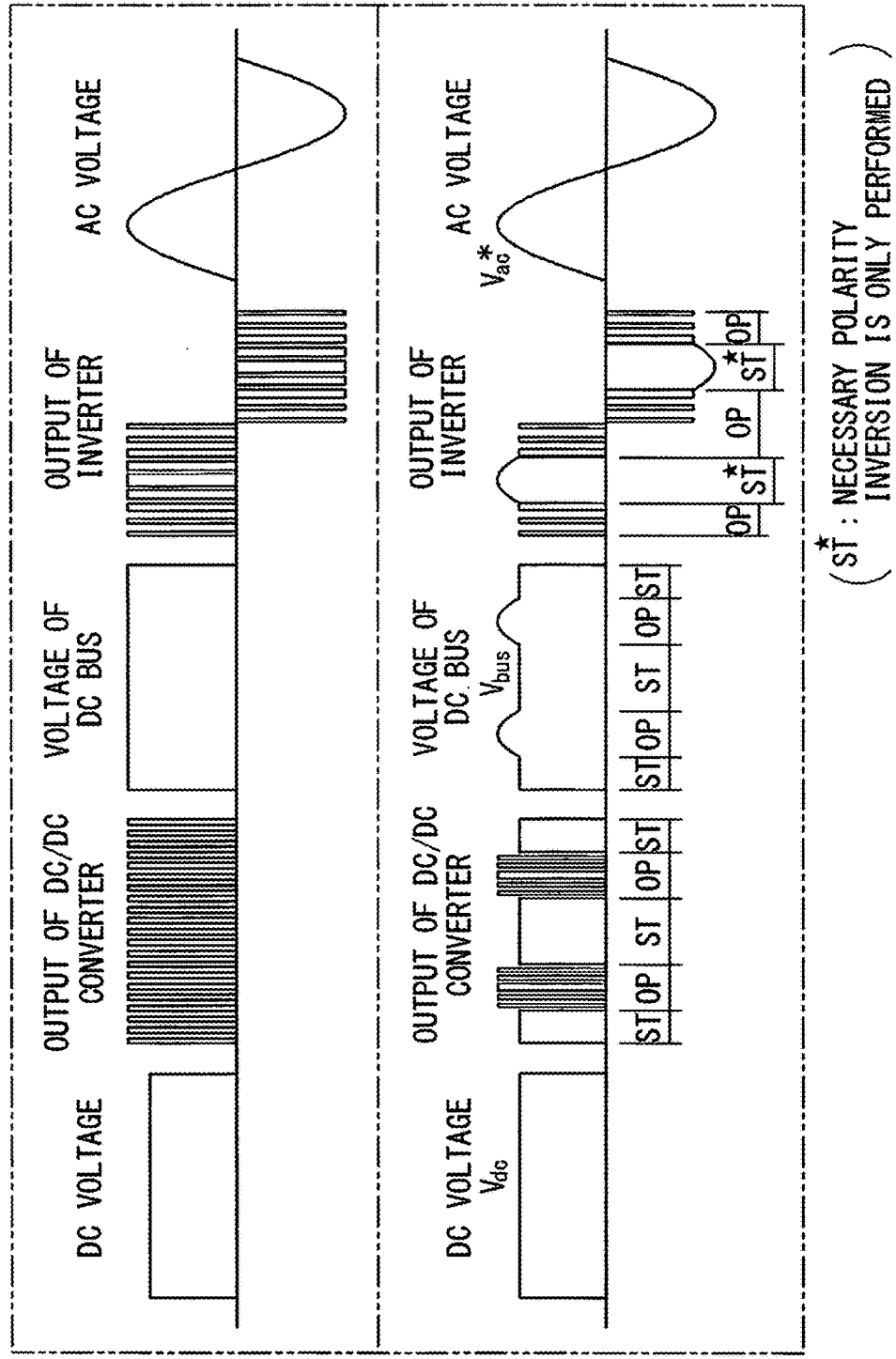
FIG. 2 is a waveform diagram (horizontally depicted) schematically showing the feature of operations of a DC/DC converter and an inverter in a minimum switching conversion method.
Figure 3:
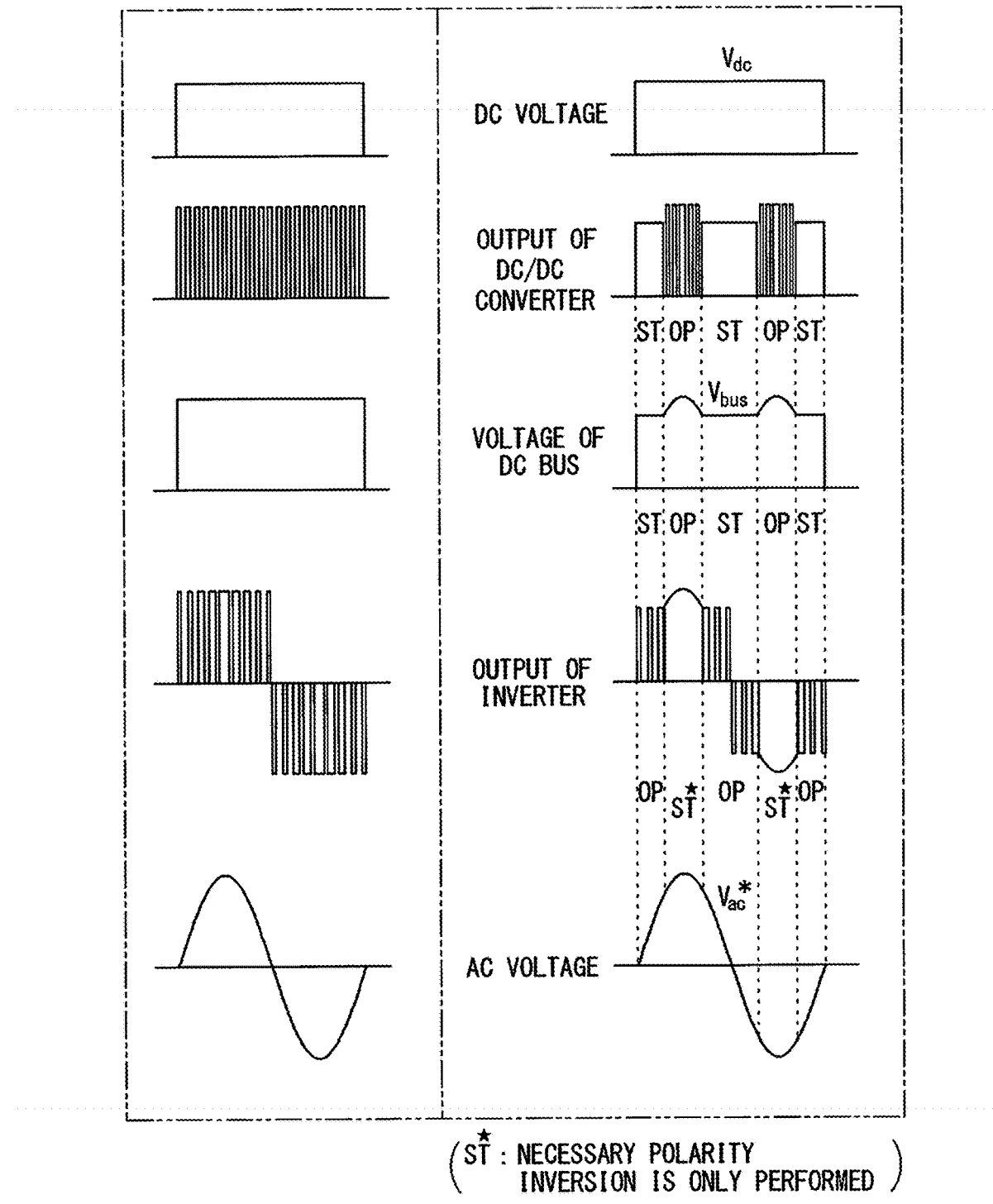
FIG. 3 is a waveform diagram (vertically depicted) schematically showing the feature of operations of the DC/DC converter and the inverter in the minimum switching conversion method.

FIG. 2 and FIG. 3 are waveform diagrams schematically showing the feature of operations of the DC/DC converter 6 and the inverter 10 in the minimum switching conversion method. FIG. 2 and FIG. 3 show the same content, but in particular, FIG. 2 shows the relationship of amplitudes from DC input to AC output in an easily understood manner, and in particular, FIG. 3 shows the timings of the control in an easily understood manner. The upper stage in FIG. 2 and the left column in FIG. 3 are waveform diagrams showing conventional switching control which is not based on the minimum switching conversion method, for comparison. The lower stage in FIG. 2 and the right column in FIG. 3 are waveform diagrams showing operation in the minimum switching conversion method.

First, at the upper stage in FIG. 2 (or the left column in FIG. 3), in the conventional switching control, output at the mutual connection point among the pair of switching elements and the DC reactor in the DC/DC converter in response to the inputted DC voltage is a pulse train having a higher value than the DC voltage and arranged at regular intervals. This output is smoothed by the intermediate capacitor and then arises as the voltage of the DC bus. On the other hand, the inverter performs switching under PWM (Pulse Width Modulation) control while inverting the polarity per half cycle. As a result, a sinusoidal AC voltage is obtained through final smoothing.

Next, in the minimum switching conversion method at the lower stage in FIG. 2 (or the right column in FIG. 3), the DC/DC converter 6 and the inverter 10 operate in accordance with a result of comparison between the absolute value of the instantaneous value of a voltage target value $V_{ac}^*$ of an AC waveform, and a DC voltage $V_{dc}$ which is the input. Here, $V_{ac}^*$ is a voltage target value, at the AC-side output end of the inverter 10, for which influence of the filter circuit 11 on current and voltage is taken into consideration. $V_{dc}$ is a value obtained by considering voltage drop by the DC reactor 7 with respect to the voltage between both ends of the DC power supply 2. When the absolute value of the voltage target value $V_{ac}^*$ satisfies $|V_{ac}^*| < V_{dc}$ (or $|V_{ac}^*| \leq V_{dc}$), the DC/DC converter 6 is stopped ("ST" in the drawing), and when the absolute value of the voltage target value $V_{ac}^*$ satisfies $|V_{ac}^*| \geq V_{dc}$ (or $|V_{ac}^*| > V_{dc}$), the DC/DC converter 6 performs boost operation ("OP" in the drawing). The output of the DC/DC converter 6 is smoothed by the intermediate capacitor 9, and then arises as a voltage $V_{bus}$ on the DC bus 8 as shown in the drawing.

Here, the intermediate capacitor 9 has a small capacitance. Therefore, a partial waveform to be around the peak of the absolute value of the AC waveform is left as it is without being smoothed. That is, the intermediate capacitor 9 has such a small capacitance that, while the smoothing acts to such an extent that eliminates the trace of the high-frequency switching by the DC/DC converter 6, a low-frequency wave having a frequency about twice as high as the commercial frequency cannot be smoothed.

On the other hand, as for the inverter 10, in accordance with a result of comparison between the absolute value of the voltage target value $V_{ac}^*$ and the DC voltage $V_{dc}$, when $|V_{ac}^*| < V_{dc}$ (or $|V_{ac}^*| \leq V_{dc}$) is satisfied, high-frequency switching is performed ("OP" in the drawing), and when $|V_{ac}^*| \geq V_{dc}$ (or $|V_{ac}^*| > V_{dc}$) is satisfied, the high-frequency switching is stopped ("ST" in the drawing). When the inverter 10 stops high-frequency switching, the inverter 10 selects either a state in which the switching elements Q3, Q6 are ON and the switching elements Q4, Q5 are OFF (non-inversion), or a state in which the switching elements Q3, Q6 are OFF and the switching elements Q4, Q5 are ON (inversion), thereby only performing necessary polarity inversion. The output of the inverter 10 is smoothed by the AC reactor 12 and the AC-side capacitor 13, whereby desired AC output is obtained.

Here, as shown in the right column in FIG. 3, the DC/DC converter 6 and the inverter 10 alternately perform high-frequency switching. When the DC/DC converter 6 performs boost operation, the inverter 10 stops high-frequency switching and only performs necessary polarity inversion for voltage of the DC bus 8. On the other hand, when the inverter 10 performs high-frequency switching operation, the DC/DC converter 6 is stopped and a voltage based on the voltage between both ends of the DC-side capacitor 5 arises on the DC bus 8 via the DC reactor 7 and the diode d1.

As described above, the operations by the DC/DC converter 6 and the inverter 10 in the minimum switching conversion method are performed. In such a power conversion device 1, since stop periods arise in high-frequency switching of the switching element Q1 to Q6, the number of times of high-frequency switching in total can be decreased. Thus, the efficiency of power conversion can be greatly improved.

«Example of Nonlinear Load»

Figure 4:
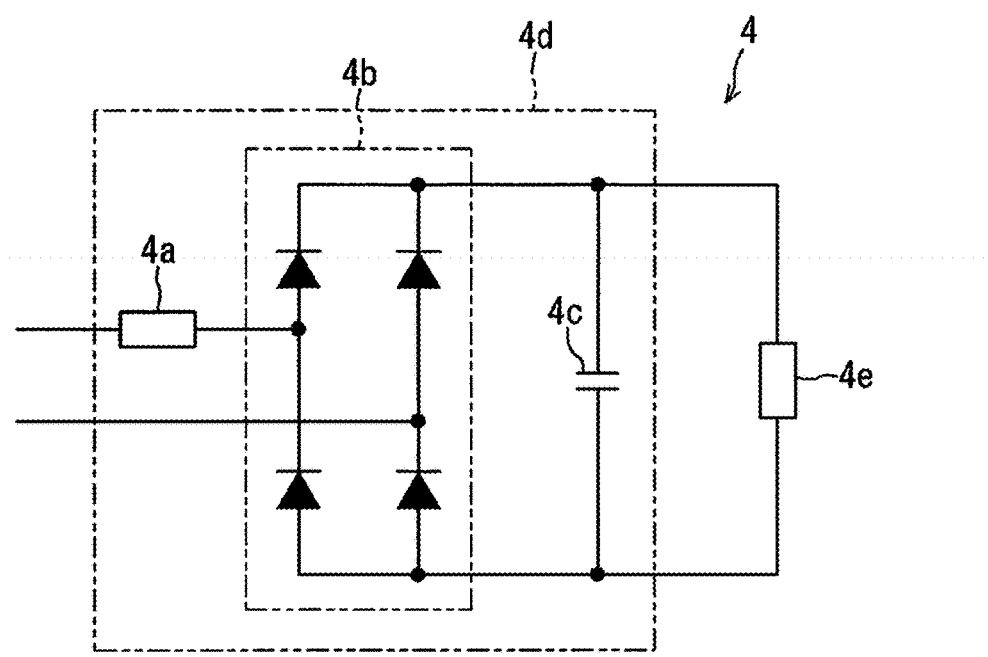
FIG. 4 is a diagram showing a capacitor-input rectification circuit as an example of a nonlinear load.

FIG. 4 is a diagram showing a capacitor-input rectification circuit as an example of a nonlinear load. In FIG. 4, in a capacitor-input rectification circuit 4d, an AC voltage is inputted to a diode bridge 4b via a resistor 4a. A capacitor 4c is connected in parallel on the DC output side of the diode bridge 4b. A DC load 4e is connected to the capacitor-input rectification circuit 4d. In a state in which the electric charge of the capacitor 4c is zero (or close to zero), if an AC voltage is inputted to the diode bridge 4b, an inrush current to charge the capacitor 4c flows, during a short time, though. The capacitor 4c with the electric charge being zero or close to zero is almost short-circuited with respect to the applied voltage, and therefore the inrush current becomes large. The peak value of the inrush current depends on the resistance value of a closed circuit formed by the diode bridge 4b and the capacitor 4c.

«Control when Nonlinear Load is Connected (Reference Example)»

FIG. 5 is a voltage/current waveform diagram when a nonlinear load such as the capacitor-input rectification circuit 4d is connected as the load 4 of the power conversion device 1 in FIG. 1 in a case of not taking a measure described later, for comparison. In FIG. 5, (a) shows an output voltage $V_a$ ($\approx V_{ac}^*$) detected by the voltage sensor 18 in FIG. 1, (b) shows the absolute value of the voltage target value $V_{ac}^*$ as a base for the output voltage of (a), and the DC voltage $V_{dc}$, (c) shows the output current detected by the current sensor 17 or the current sensor 19, (d) shows the gate voltage (gate-source voltage) of the switching element Q2 (which performs switching at the time of boost operation) on the low side of the DC/DC converter 6, and (e) shows the gate voltage of, for example, the switching element Q3 (which performs switching at the time of step-down operation) of the inverter 10.

In FIG. 5, in a state in which the load 4 is not connected, boost operation by the DC/DC converter 6 and step-down operation by the inverter 10 are alternately performed in accordance with comparison between the absolute value of the voltage target value $V_{ac}^*$ of the AC voltage, and the DC voltage $V_{dc}$.

Here, for example, at time is when the voltages of (a), (b) are zero-crossing, if the nonlinear load 4 (4d) is connected, as shown in (c), an inrush current flows and sharply becomes a large value with increase in the output voltage. Here, when the inrush current reaches an instantaneous overcurrent protection threshold value $I_{th\_p}$, of the power conversion device 1 at time te, for the purpose of protection, the control unit 14 performs gate blocking for both the DC/DC converter 6 and the inverter 10 and the power conversion device 1 stops. In this case, reset and restart are needed, and if a person is to perform these, the operation is expected to be stopped during a long period. Even if reset and restart are automatically performed after a certain time elapsed, a certain length of operation stop period arises.

«Embodiment of Control when Nonlinear Load is Connected»

Figure 6:
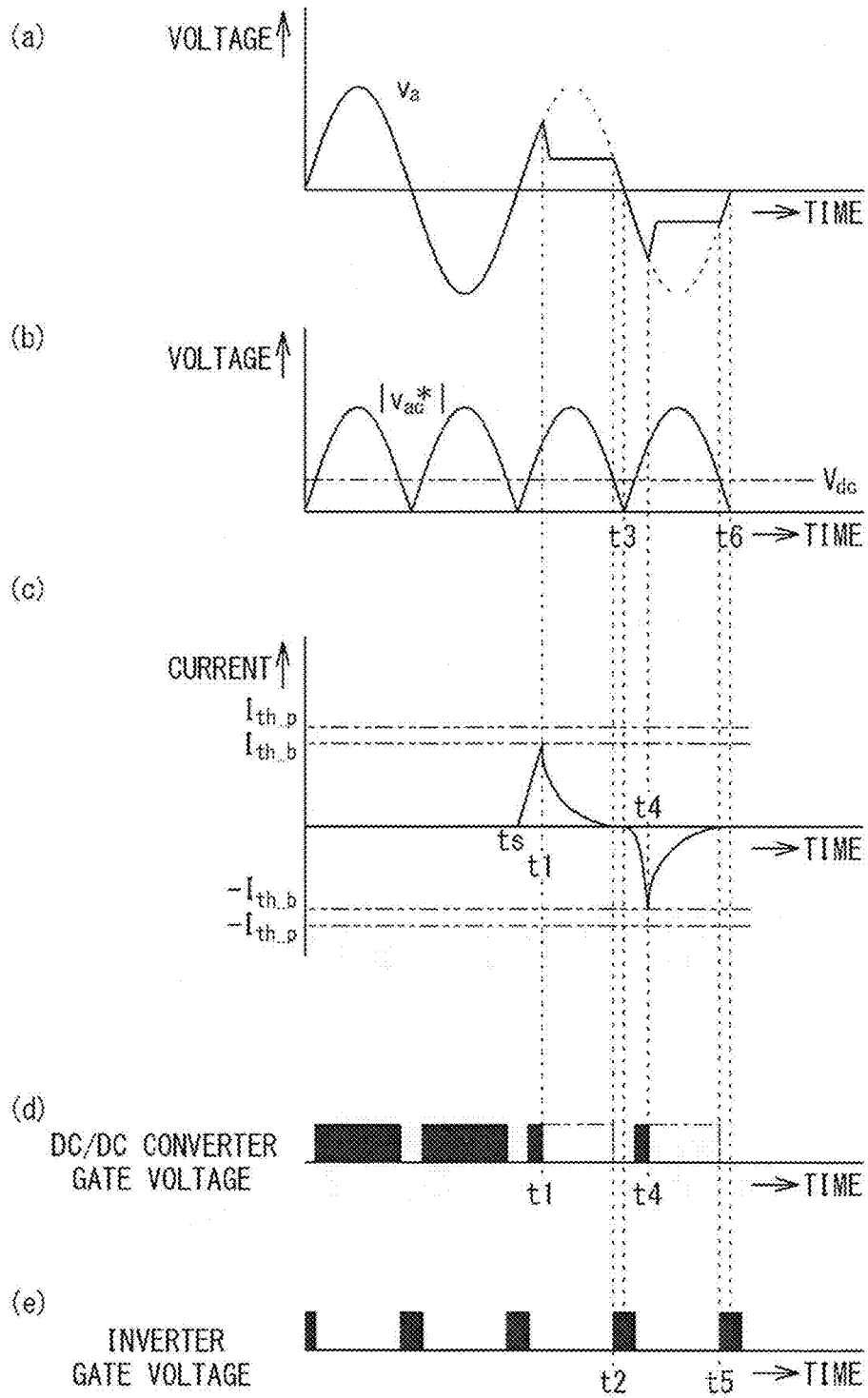
FIG. 6 is a voltage/current waveform diagram when a nonlinear load such as a capacitor-input rectification circuit is connected as a load of the power conversion device in FIG. 1 in one embodiment of the present invention.

Next, FIG. 6 is a voltage/current waveform diagram when a nonlinear load such as the capacitor-input rectification circuit 4d is connected as the load 4 of the power conversion device 1 in FIG. 1 in one embodiment of the present invention. In FIG. 6, (a) shows an output voltage $V_a$ detected by the voltage sensor 18 in FIG. 1, (b) shows the absolute value of the voltage target value $V_{ac}^*$ and the DC voltage $V_{dc}$, (c) shows the output current detected by the current sensor 17 or the current sensor 19, (d) shows the gate voltage (gate-source voltage) of the switching element Q2 (which performs switching at the time of boost operation) on the low side of the DC/DC converter 6, and (e) shows the gate voltage of, for example, the switching element Q3 (which performs switching at the time of step-down operation) of the inverter 10.

In FIG. 6, in a state in which no load is connected, boost operation by the DC/DC converter 6 and step-down operation by the inverter 10 are alternately performed in accordance with comparison between the absolute value of the voltage target value $V_{ac}{}^*$ and the DC voltage $V_{dc}$.

Here, for example, at time is when the voltages of (a), (b) are zero-crossing, if the nonlinear load 4 (4d) is connected, as shown in (c), an inrush current flows and sharply becomes a large value with increase in the output voltage. Here, at time t1, when the inrush current reaches a converter gate block threshold value $I_{th\_b}$ which has a smaller absolute value than an instantaneous overcurrent protection threshold value $I_{th\_p}$, of the power conversion device 1, the control unit 14 performs gate blocking for the switching element Q2 of the DC/DC converter 6. However, the control unit 14 does not perform gate blocking for the inverter 10. As a result of the gate blocking for the switching element Q2 of the converter 6, the boost operation is stopped immediately, and as shown in (a), the output voltage $V_a$ drops to the level of the DC voltage $V_{dc}$ and remains in this state until a finish time t2 of the switching period of the DC/DC converter 6. After time t2, the inverter 10 operates and the AC waveform is partially restored.

At the next zero-cross time t3, the control unit 14 cancels the gate blocking for the switching element Q2 of the DC/DC converter 6. As a result, in the half cycle from this next zero-crossing, boost operation of the DC/DC converter 6 can be performed again.

In the half AC cycle after the zero-cross time t3, the direction of the output current changes. In addition, with increase in the output voltage toward the negative direction, the output current sharply becomes a large value again. Here, at time t4, when the inrush current reaches a converter gate block threshold value $-I_{th\_b}$ which has a smaller absolute value than an instantaneous overcurrent protection threshold value $-I_{th\_p}$ of the power conversion device 1, the control unit 14 performs gate blocking for the switching element Q2 of the DC/DC converter 6. However, the control unit 14 does not perform gate blocking for the inverter 10. As a result of the gate blocking for the switching element Q2 of the converter 6, the boost operation is stopped immediately, and as shown in (a), the output voltage $V_a$ drops to the sign-inverted level $(-V_{dc})$ of the DC voltage $V_{dc}$ and remains in this state until a finish time t5 of the switching period of the DC/DC converter 6. After time t5, the inverter 10 operates and the AC waveform is partially restored.

Also after the next zero-cross time t6, the gate blocking for the DC/DC converter 6 and the subsequent cancellation as described above are repeatedly performed per half AC cycle as long as the output current reaches the converter gate block threshold value $I_{th\_b}$ or $-I_{th\_b}$. In this way, until the output current to the load 4 no longer reaches the converter gate block threshold value, the gate blocking and the subsequent cancellation can be repeated a necessary number of times. When charging of the capacitor 4c progresses and the output current no longer reaches the converter gate block threshold value $I_{th\_b}$ or $-I_{th\_b}$, the control unit 14 performs normal control by the minimum switching conversion method.

《Verification》

Next, verification of effectiveness of the gate blocking performed using an actual circuit will be shown. The used load was the load 4 including the capacitor-input rectification circuit 4d in FIG. 4, and a circuit constant determination method prescribed in a nonlinear load test in "JIS C 4411-3: 2014, Uninterruptible Power Systems (UPS)—Part 3: Method of specifying the performance and test requirements" was employed.

In this verification, the apparent power of the nonlinear load was set to 500 VA, the resistance value of the resistor 4a was set to 0.8Ω, the capacitance of the capacitor 4c was set to 2750 μf, and the resistance value of the DC load 4e was set to 45.1Ω. The voltage of the DC power supply 2 was 43 V, and the power conversion device 1 performed autonomous output operation with output of AC 101 V. The converter gate block threshold value $I_{th\_b}$ for gate-blocking the DC/DC converter 6 was set to 23.5 A, and the instantaneous overcurrent protection threshold value $I_{th\_p}$ was set to 80 A.

Figure 7:
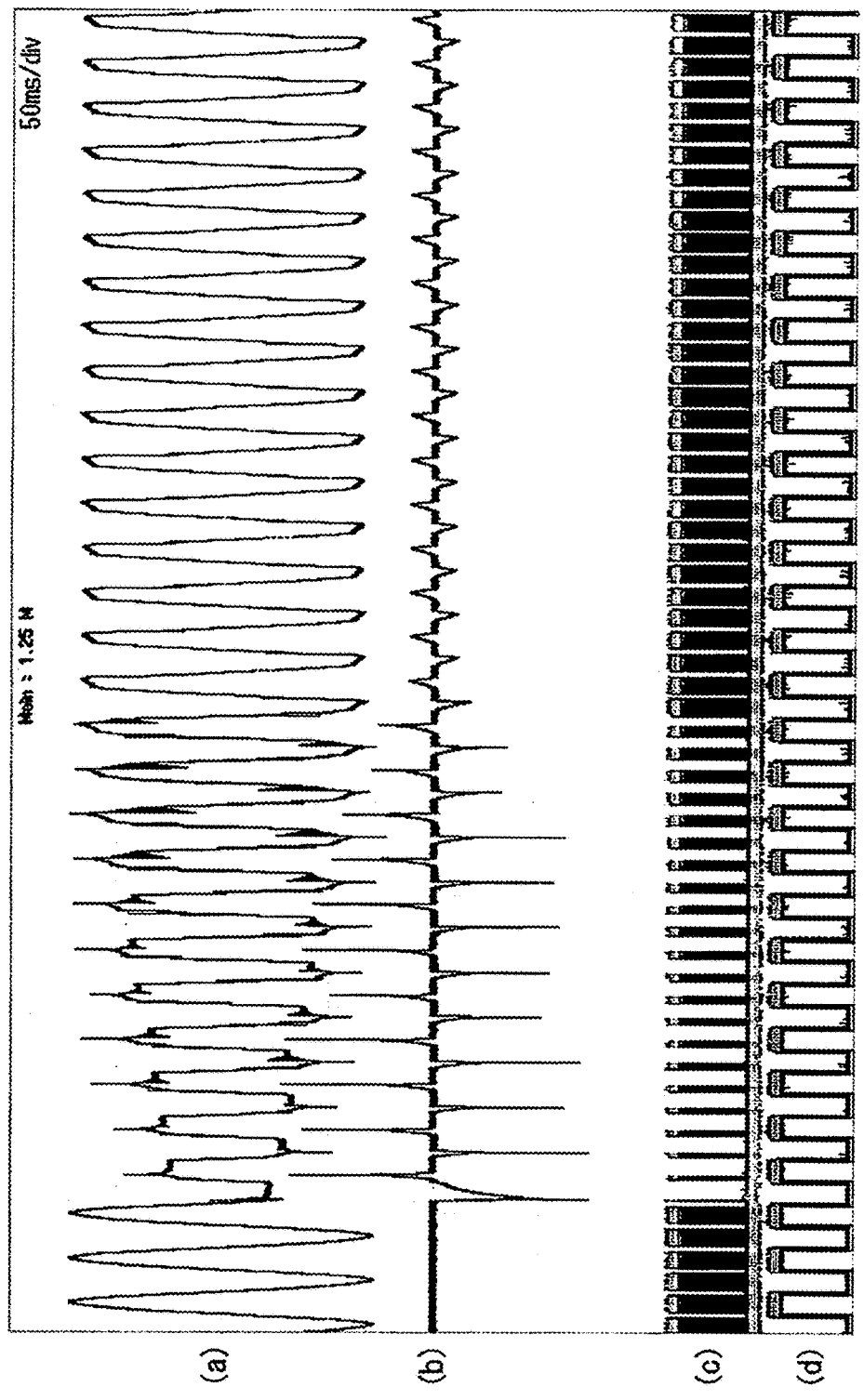
FIG. 7 is a voltage/current waveform diagram from the moment at which a nonlinear load was connected until a steady state was obtained, in the power conversion device to which a measure for inrush current by gate blocking was applied.

FIG. 7 is a voltage/current waveform diagram from the moment at which the nonlinear load was connected until a steady state was obtained, in the power conversion device 1 to which the measure for inrush current by gate blocking described above was applied.

In FIG. 7, (a) shows the output voltage, (b) shows the output current, (c) shows the gate voltage of the switching element Q2 of the DC/DC converter 6, and (d) shows the gate voltage of the switching element Q3 of the inverter 10.

Figure 8:
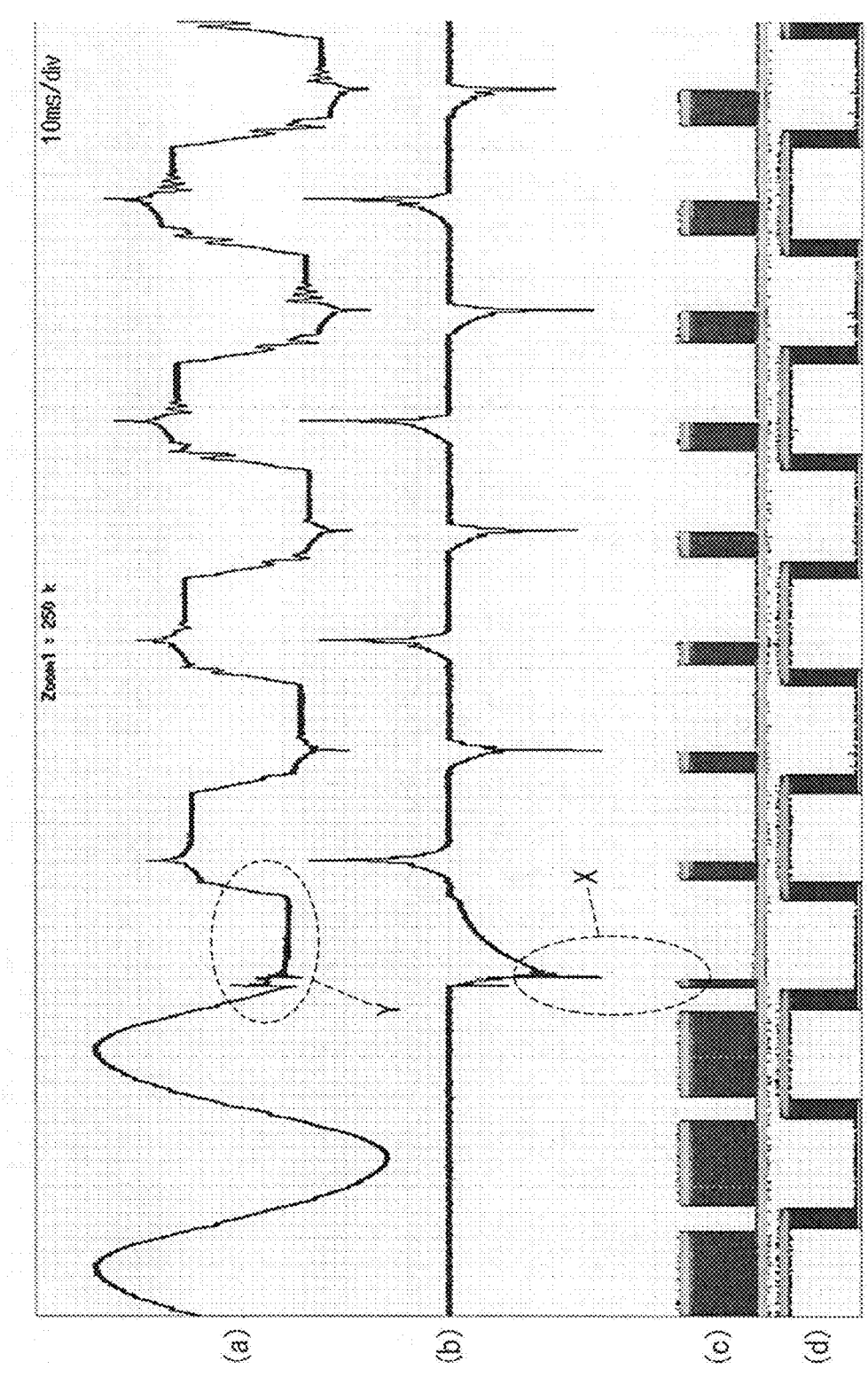
FIG. 8 is a time axis enlarged diagram around the time when the nonlinear load was connected in FIG. 7.
Figure 9:
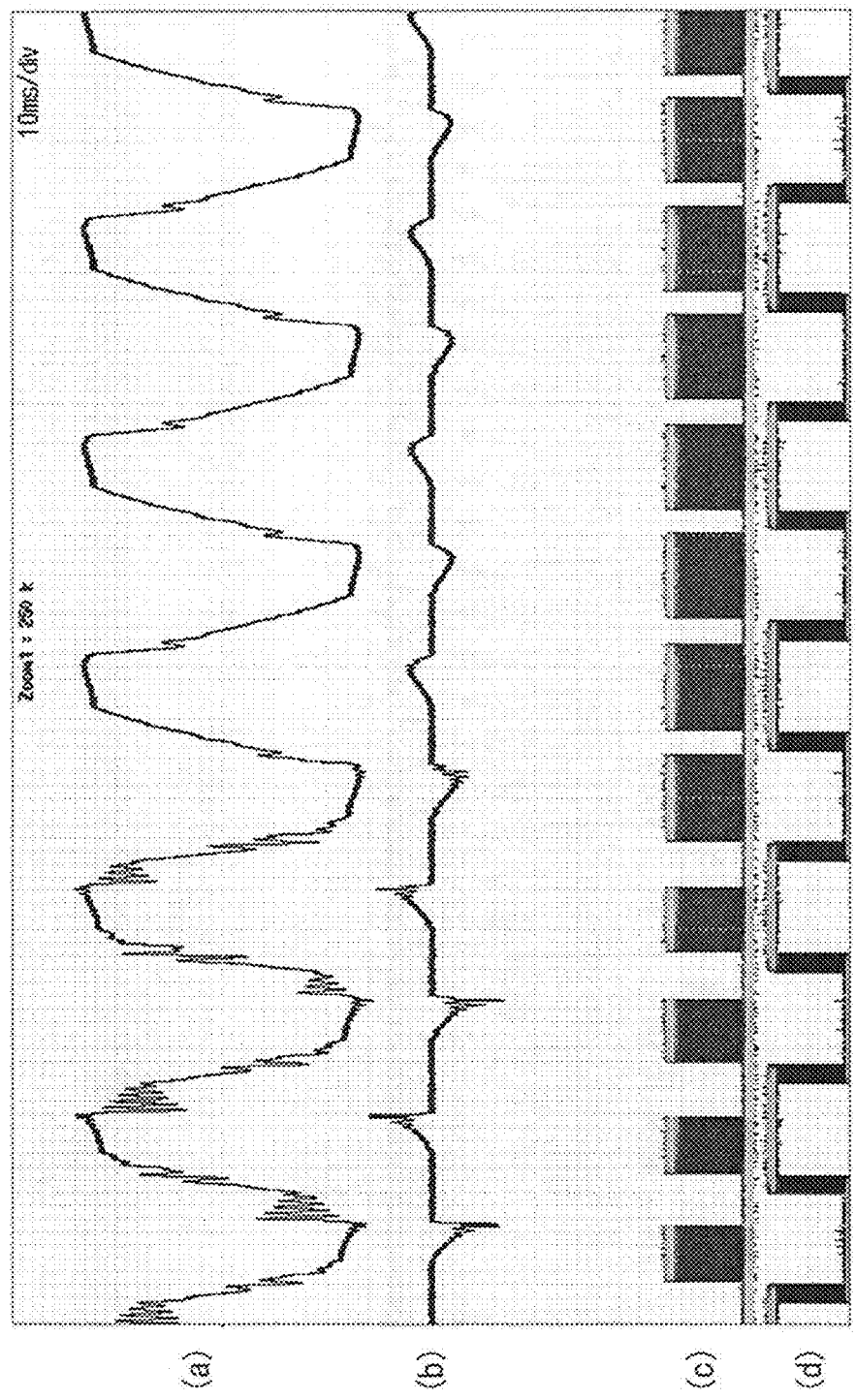
FIG. 9 is a time axis enlarged diagram around the time when the steady state was obtained in FIG. 7.

FIG. 8 is a time axis enlarged diagram around the time when the nonlinear load was connected in FIG. 7. FIG. 9 is a time axis enlarged diagram around the time when the steady state was obtained in FIG. 7.

In FIG. 8, as shown at part X, the DC/DC converter 6 is gate-blocked at the moment at which the output current of (b) reaches the converter gate block threshold value $(I_{th\_b})$. Thus, as shown at part Y, the output voltage of (a) comes to no longer keep a sinewave shape, whereby voltage increase is stopped, and it is found that operation of the power conversion device 1 is successfully continued without the output current increasing to the instantaneous overcurrent protection threshold value $(I_{th\_p})$.

In FIG. 9, the peak value of the output current of (b) decreases, and in the latter half, the steady state is reached. It is noted that, since the voltage between both ends of the capacitor 4c in FIG. 4 becomes an effective value obtained by smoothing a pulsating current full-wave rectified by the diode bridge 4b, a ripple around the peak value of the pulsating current continues even in the steady state.

Also regarding the gate voltage of the DC/DC converter 6 shown in (c), it is found that, in the latter half, gate blocking is no longer performed, and the DC/DC converter 6 performs switching and stoppage alternately with the inverter 10 shown in (d), thus performing the operation by the minimum switching conversion method.

Figure 10:
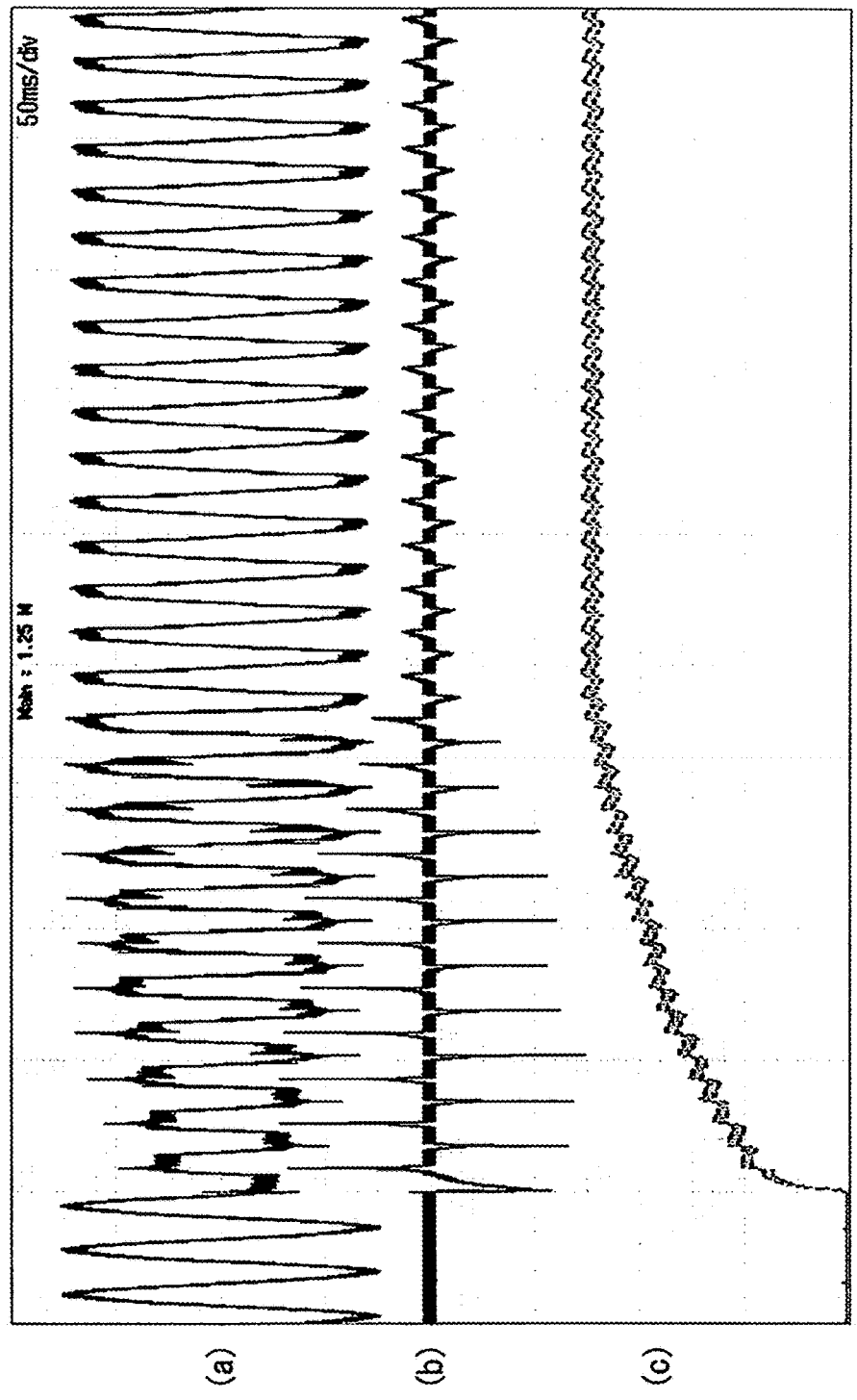
FIG. 10 is a voltage/current waveform diagram from the moment at which the nonlinear load was connected until a steady state was obtained.

Similarly, FIG. 10 is a voltage/current waveform diagram from the moment at which the nonlinear load was connected until a steady state was obtained. In FIG. 10, (a) shows the output voltage, (b) shows the output current, and (c) shows the voltage between both ends of the load 4. In FIG. 10, it is found that the voltage between both ends of the load 4 gradually increases until reaching the steady state.

SUMMARY

As described in detail above, the power conversion device 1 of the present embodiment basically performs control such that, in one AC cycle, a period during which the DC/DC converter 6 performs boost operation and the inverter 10 stops high-frequency switching, and a period during which the inverter 10 performs step-down operation and the DC/DC converter 6 stops high-frequency switching, arise alternately. The generated AC voltage waveform is, as it were, a combined waveform outputted by the DC/DC converter and the inverter operating alternately. A waveform part having a relatively great absolute value around the peak value is generated by the DC/DC converter 6, and a waveform part having a relatively small absolute value around a zero cross point is generated by the inverter 10.

Under such minimum switching conversion control, in a case where the load 4 is a nonlinear load, a large inrush current flows when power feeding from the power conversion device 1 to the load 4 is started. Then, when the absolute value of a current (z output current) flowing through the AC reactor 12 by the start of power feeding to the load 4 reaches the converter gate block threshold value, the control unit 14 temporarily performs gate blocking for only the DC/DC converter 6, without performing gate blocking for the inverter 10.

By gate blocking for the DC/DC converter 6, if the DC/DC converter 6 is operating, the boost operation is immediately stopped. Thus, the output current flowing through the AC reactor 12 is reduced and does not reach the instantaneous overcurrent protection threshold value. On the other hand, gate blocking is not performed for the inverter 10, and therefore, when a timing (phase) for the inverter to perform high-frequency switching has come, a voltage in a waveform part having a smaller absolute value, of the AC voltage waveform to be generated, is outputted, and output to the load 4 approaches a steady state.

Thus, the power conversion device 1 can suppress an inrush current without stopping operation by instantaneous overcurrent protection.

It is noted that output current measurement for gate blocking may be performed by either the current sensor 17 or the current sensor 19. The current sensor 17 is provided because the current sensor 17 is needed for the minimum switching conversion method control. Therefore, the current sensor 19 may be omitted.

However, since the current sensor 17 is connected in series to the AC reactor 12 with no element therebetween, it is difficult to detect sharp change in the current, because of the influence of the AC reactor 12. In this regard, in a case where the current sensor 19 is provided between the load 4 and the AC-side capacitor 13 and connected in series to the load 4, there is an advantage that sharp change in the current flowing through the load 4 can be detected with more excellent responsiveness.

Others

In the above verification, a capacitor-input rectification circuit was used as the load 4 of the power conversion device 1. However, the same current suppression by gate blocking is effective also to a starting current of an inductive load such as a motor.

Supplement

It is noted that the embodiments disclosed herein are merely illustrative in all aspects and should not be recognized as being restrictive. The scope of the present invention is defined by the scope of the claims, and is intended to include meaning equivalent to the scope of the claims and all modifications within the scope.

REFERENCE SIGNS LIST 1 power conversion device
2 DC power supply
3 AC electric path
4 load
4a resistor
4b diode bridge
4c capacitor
4e DC load
4d capacitor-input rectification circuit
5 DC-side capacitor
6 DC/DC converter
7 DC reactor
8 DC bus
9 intermediate capacitor
10 inverter
11 filter circuit
12 AC reactor
13 AC-side capacitor
14 control unit
15 voltage sensor
16 current sensor
17 current sensor
18 voltage sensor
19 current sensor
d1 to d6 diode
Q1 to Q6 switching element

The invention claimed is:

1. A power conversion device provided between a DC power supply and an AC electric path and performing DC/AC power conversion in a state in which a DC voltage of the DC power supply is lower than a peak value of an AC voltage of the AC electric path, the power conversion device comprising:
a DC/DC converter provided between the DC power supply and a DC bus;
an intermediate capacitor connected to the DC bus and having such a small capacitance as not to smooth a pulsation that is included in a voltage of the DC bus and has a frequency twice as high as a frequency of the AC voltage;
an inverter connected to the DC bus;
a filter circuit provided between the inverter and the AC electric path and having an AC reactor and an AC-side capacitor;
a current sensor configured to detect a current flowing through the AC reactor; and
a control unit configured to perform control such that, for generating the AC voltage from the DC voltage, a period during which the DC/DC converter boosts the DC voltage and the inverter performs one of polarity non-inversion passing and polarity inversion passing, and a period during which the DC/DC converter is stopped and the inverter performs step-down operation and one of polarity non-inversion passing and polarity inversion passing, arise alternately in one AC cycle, wherein
the control unit temporarily performs gate blocking for only the DC/DC converter, upon occurrence of a phenomenon in which, by start of power feeding to a load connected to the AC electric path, an absolute value of the current flowing through the AC reactor reaches a predetermined converter gate block threshold value lower than an instantaneous overcurrent protection threshold value.

2. The power conversion device according to claim 1, wherein
the control unit cancels the gate blocking, at next zero-crossing of a voltage outputted to the load, after the gate blocking is performed.

3. The power conversion device according to claim 2, wherein
the current sensor is provided between the load and the AC-side capacitor and connected in series to the load.

4. The power conversion device according to claim 2, wherein
the control unit repeatedly executes the gate blocking and the cancellation of the gate blocking until the phenomenon no longer occurs.

5. The power conversion device according to claim 4, wherein
the current sensor is provided between the load and the AC-side capacitor and connected in series to the load.

6. The power conversion device according to claim 1, wherein
the current sensor is provided between the load and the AC-side capacitor and connected in series to the load.

7. A control method for a power conversion device, the power conversion device being provided between a DC power supply and an AC electric path and performing DC/AC power conversion in a state in which a DC voltage of the DC power supply is lower than a peak value of an AC voltage of the AC electric path, the power conversion device including: a DC/DC converter provided between the DC power supply and a DC bus; an intermediate capacitor connected to the DC bus and having such a small capacitance as not to smooth a pulsation that is included in a voltage of the DC bus and has a frequency twice as high as a frequency of the AC voltage; an inverter connected to the DC bus; and a filter circuit provided between the inverter and the AC electric path and having an AC reactor and an AC-side capacitor, the control method comprising:
performing control such that, for generating the AC voltage from the DC voltage, a period during which the DC/DC converter boosts the DC voltage and the inverter performs one of polarity non-inversion passing and polarity inversion passing, and a period during which the DC/DC converter is stopped and the inverter performs step-down operation and one of polarity non-inversion passing and polarity inversion passing, arise alternately in one AC cycle; and temporarily performing gate blocking for only the DC/DC converter, upon occurrence of a phenomenon in which, by start of power feeding to a load connected to the AC electric path, an absolute value of the current flowing through the AC reactor reaches a predetermined converter gate block threshold value lower than an instantaneous overcurrent protection threshold value.

8. A power conversion device provided between a DC power supply and an AC electric path and performing DC/AC power conversion in a state in which a DC voltage of the DC power supply is lower than a peak value of an AC voltage of the AC electric path, the power conversion device comprising:
a DC/DC converter provided between the DC power supply and a DC bus;
an intermediate capacitor connected to the DC bus and having such a small capacitance as not to smooth a pulsation that is included in a voltage of the DC bus and has a frequency twice as high as a frequency of the AC voltage;
an inverter connected to the DC bus;
a filter circuit provided between the inverter and the AC electric path and having an AC reactor and an AC-side capacitor;
a current sensor configured to detect a current flowing through the AC reactor; and
a control unit configured to perform control such that, for generating the AC voltage from the DC voltage, a period during which the DC/DC converter boosts the DC voltage and the inverter performs one of polarity non-inversion passing and polarity inversion passing, and a period during which the DC/DC converter is stopped and the inverter performs step-down operation and one of polarity non-inversion passing and polarity inversion passing, arise alternately in one AC cycle, wherein
upon occurrence of a phenomenon in which, by start of power feeding to a load connected to the AC electric path, an absolute value of the current flowing through the AC reactor reaches a predetermined converter gate block threshold value lower than an instantaneous overcurrent protection threshold value, the control unit allows the inverter to perform switching operation without performing gate blocking for the inverter, and performs gate blocking for the DC/DC converter until next zero-crossing of a voltage outputted to the load.

* * * * *